(12) United States Patent
Lee et al.

(10) Patent No.: US 7,652,370 B2
(45) Date of Patent: Jan. 26, 2010

(54) PLASTIC MICROFABRICATED STRUCTURE FOR BIOCHIP, MICROFABRICATED THERMAL DEVICE, MICROFABRICATED REACTOR, MICROFABRICATED REACTOR ARRAY, AND MICRO ARRAY USING THE SAME

(75) Inventors: Dae Sik Lee, Daejeon-Shi (KR); Hae Sik Yang, Daejeon-Shi (KR); Yong Taik Lim, Jeollabuk-Do (KR); Kwang Hyo Chung, Daejeon-Shi (KR); Sung Jin Kim, Daejeon-Shi (KR); Se Ho Park, Daejeon-Shi (KR); Kyu Won Kim, Daejeon-Shi (KR); Yun Tae Kim, Daejeon-Shi (KR)

(73) Assignee: Electronics and Telecommunications Research Institute, Daejeon-Shi (KR)

( * ) Notice: Subject to any disclaimer, the term of this patent is extended or adjusted under 35 U.S.C. 154(b) by 96 days.

(21) Appl. No.: 10/899,177

(22) Filed: Jul. 27, 2004

(65) Prior Publication Data

US 2005/0139993 A1    Jun. 30, 2005

(30) Foreign Application Priority Data

Dec. 26, 2003   (KR)   ...................... 10-2003-0097066

(51) Int. Cl.
*H01L 29/06*   (2006.01)
(52) U.S. Cl. .................. 257/706; 438/1; 438/2
(58) Field of Classification Search .......... 257/706, 257/720, 414–415, 467, 417, 619, E23.007; 436/518; 359/224; 438/1–2
See application file for complete search history.

(56) References Cited

U.S. PATENT DOCUMENTS 5,674,742 A    10/1997   Northrup et al.

(Continued)

FOREIGN PATENT DOCUMENTS

KR    10-2002-0038012    5/2002

OTHER PUBLICATIONS

Jin-Woo Choi, et al.; A Disposable Plastic Biochip Cartridge With On-Chip Power Sources for Blood Analysis; ; 0-7803-7744-3/03/ $17.00 © 2003 IEEE; pp. 447-450.

*Primary Examiner*—Zandra Smith
*Assistant Examiner*—Tsz K Chiu
(74) *Attorney, Agent, or Firm*—Lowe Hauptman Ham & Berner, LLP (57) ABSTRACT

Provided are a plastic microfabricated structure, and a microfabricated thermal device, a microfabricated reactor, a microfabricated reactor array and a micro array using the same, which may be applied to a bio chip, and the present invention may fabricate the plastic microfabricated structure for providing a heating region by means of insulating plastic, which has a thin thickness, flatness enough to allow a photolithography process to be performed, thermal isolation in its some or total area, and a small thermal mass, and on top of the heating region of the plastic microfabricated structure, a heater, a temperature sensor for sensing a temperature, an electrode, and an electrode pad are formed to thereby fabricate the microfabricated heating device, whereby element may be readily fabricated at a low cost, and the heating region is formed of a plastic thin layer, so that uniform temperature control is possible even with a low power, and various samples may be thermally treated at a fast speed to obtain their reaction and analysis.

9 Claims, 9 Drawing Sheets

U.S. PATENT DOCUMENTS

| | | |
|---|---|---|
| 5,939,312 A | 8/1999 | Baier et al. |
| 6,176,962 B1 | 1/2001 | Soane et al. |
| 6,716,620 B2 * | 4/2004 | Bashir et al. ............. 435/287.2 |
| 6,842,545 B2 * | 1/2005 | Lackritz et al. ............... 385/14 |
| 6,882,455 B2 * | 4/2005 | Arima ........................ 359/224 |
| 6,939,451 B2 * | 9/2005 | Zhao et al. .................. 204/451 |
| 2002/0022261 A1 * | 2/2002 | Anderson et al. ........ 435/287.2 |
| 2003/0146377 A1 * | 8/2003 | Miller et al. ................. 250/286 |
| 2003/0175947 A1 * | 9/2003 | Liu et al. ................. 435/288.5 |

\* cited by examiner

PLASTIC MICROFABRICATED STRUCTURE FOR BIOCHIP, MICROFABRICATED THERMAL DEVICE, MICROFABRICATED REACTOR, MICROFABRICATED REACTOR ARRAY, AND MICRO ARRAY USING THE SAME

BACKGROUND

1. Field of the Invention

The present invention generally relates to a structure that may be used for micro reaction or analysis in a bio Micro Electro Mechanical System (MEMS), and more particularly, to a plastic microfabricated structure for a bio chip, and a microfabricated thermal device, a microfabricated reactor, a microfabricated reactor array and a micro array using the same, which employ plastic that has high flatness, thermal isolation, and small thermal mass.

2. Discussion of Related Art

In general, a bio MEMS device, in particular, a lab-on-a-chip for medical and disease diagnosis using DNA allows a real time diagnosis to be performed, so that many researches are conducted to implement its small size and low cost. Preference is made to general purpose medical diagnosis equipment such as single use type. As a result, attentions are moved from materials such as silicon and glass to plastics which require a relatively low cost in recent years.

A high temperature is required to process DNA in a DNA lab-on-a-chip. In particular, a temperature of about 40° C. to 100° C. is required for cell lysis, DNA amplification (mainly, polymerase chain reaction (PCR)), reaction control, fluid transport, and so forth. In recent years, many microfabricated thermal devices are developed for the above-mentioned process, however, the silicon and glass are mainly employed for material of the devices.

In particular, a short analysis time is required for the real time diagnosis and low power consumption to be suitable for portable battery in a case of lab-on-a-chip. To that end, the structure should be designed and fabricated to allow thermal isolation and have small thermal mass. Conventional structures have been fabricated by semiconductor process technique employing silicon as their materials because the process technique is well established and allows a micro pattern to be formed. For example, thermal circulation devices having several chambers are fabricated using silicon etching. (See U.S. Pat. No. 5,589,136 (December 1996) to Northrup et al and U.S. Pat. No. 5,716,842 (February 1998) to Baier Volker et al.) When these techniques are employed, a thermal heater may be implemented for all reaction chambers, however, it is difficult to remove thermal cross-talk due to thermal isolation properties between reaction chambers. Thus, it has a difficulty in applying for chambers which separately have an independent temperature circulation rule. In addition, performance of devices is superior because they use a silicon material, however, it requires an extremely clean laboratory and high cost equipment capable of performing semiconductor processes, which causes fabrication cost and time to be increased, and makes it hard to apply for a single use medical diagnostic device.

A system in which a capillary electrophoresis (CE) device and a reaction chamber are combined is fabricated using a glass substrate, and PCR (DNA amplification) is performed on the glass substrate. (See Analytic Chemistry Paper, R.A. Mathies group of UC Berkeley, entitled "Single-molecule DNA amplification and analysis in an integrated microfluidic device", Feb. 1, 2001.) However, this technique makes it hard to process the glass substrate and fabricate a heating thin layer having a small thermal mass. As a result, power consumption is high and reaction speed is slow, which causes an additional Proportional Integrated Differential (PID) controller to be attached to.

As such, there exists a need for obtaining another device, which has thermal properties such as that of silicon or glass, facilitates a process, and allows it to be fabricated at a low cost.

Plastic in the lab-on-a-chip is significantly limited to be used for fabricating the structure such as fluid path, channel, and chamber among micro-fluidic devices. However, the plastic has advantages of low cost, easy processing, and low thermal interference due to extremely low thermal conductivity. Nevertheless, the plastic microfabricated structure could not have been applied for a thermal device of the lab-on-a-chip for the disease diagnosis due to a lack of technique for fabricating a structure having heat resistance, compatibility to semiconductor process technique, substrate flatness, and small thermal mass. To cope with this problem, there exists a need for developing a technique capable of allowing heat resistance, flatness enough to allow a photolithography process to be performed, the material capable of being subject to stringent conditions of the semiconductor process, and capable of fabricating a microfabricated structure having a small thermal mass by employing the same.

SUMMARY OF THE INVENTION

The present invention is directed to a plastic microfabricated structure allowing micro patterns to be formed, and a microfabricated thermal device, a microfabricated reactor, a microfabricated reactor array and a micro array using the same, which may be fabricated by standard semiconductor process techniques and with a low cost compared to a conventional bio MEMS device employing conventional silicon or glass.

The present invention is also directed to a plastic microfabricated structure for allowing a photolithography process to be applied and allowing thermal isolation due to small thermal mass, fast heat response properties and uniform temperature distribution properties, and a microfabricated thermal device, a microfabricated reactor, a microfabricated reactor array and a micro array using the same.

One aspect of the present invention is to provide a plastic microfabricated structure for a biochip, which comprises a plastic microfabricated substrate having a predetermined thickness and for providing a heating region; and a support member for supporting the plastic microfabricated substrate.

Another aspect of the present invention is to provide a microfabricated thermal device, which comprises a plastic microfabricated structure; a heater formed on the plastic microfabricated substrate of the plastic microfabricated structure; an electrode formed on the plastic microfabricated substrate and connected to the heater; an electrode pad formed on the plastic microfabricated substrate and connected to the electrode; a temperature sensor formed on the plastic microfabricated substrate and for sensing heat; and an insulating layer formed on the plastic microfabricated substrate including the heater, electrode, temperature sensor, and electrode pad.

Yet another aspect of the present invention is to provide a microfabricated reactor, which comprises a first plastic microfabricated structure including a plastic microfabricated substrate having a predetermined thickness for providing a heating region, and a support member for supporting the plastic microfabricated substrate; a heater formed on the plastic microfabricated substrate of the first plastic microfabricated structure; an electrode formed on the plastic microfabricated substrate and connected to the heater; an electrode pad formed on the plastic microfabricated substrate and connected to the electrode; a temperature sensor formed on the plastic microfabricated substrate and for sensing heat; an insulating layer formed on the plastic microfabricated substrate including the heater, electrode, temperature sensor, and electrode pad; and a second plastic microfabricated structure bonded onto the insulating layer, and including a plastic microfabricated substrate having a predetermined thickness for providing a heating region, and a support member for supporting the plastic microfabricated substrate.

Yet another aspect of the present invention is to provide a microfabricated reactor array, which comprises a first plastic microfabricated structure including a plastic substrate having a predetermined thickness for providing a plurality of heating regions, and a support member for supporting the plastic microfabricated substrate; heater, electrode, electrode pad, and temperature sensor formed on each of heating regions of the first plastic microfabricated structure; an insulating layer formed on the first plastic microfabricated structure including the heater, electrode, electrode pad, and temperature sensor; a second plastic structure bonded to the insulating layer, and including a plastic microfabricated substrate having a predetermined thickness for providing a plurality of heating regions, and a support member for supporting the plastic microfabricated substrate.

Yet another aspect of the present invention is to provide a micro array, which comprises the above-mentioned plastic microfabricated structure; and a plurality of sites formed on the plastic microfabricated structure, and comprised of metal that has been subject to surface treatment.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF PREFERRED EMBODIMENTS

The present invention will now be described more fully hereinafter with reference to the accompanying drawings, in which preferred embodiments of the field emission device are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the thickness of layers and regions are exaggerated for clarity. Like numbers refer to like elements throughout the specification.

Figure 1A:
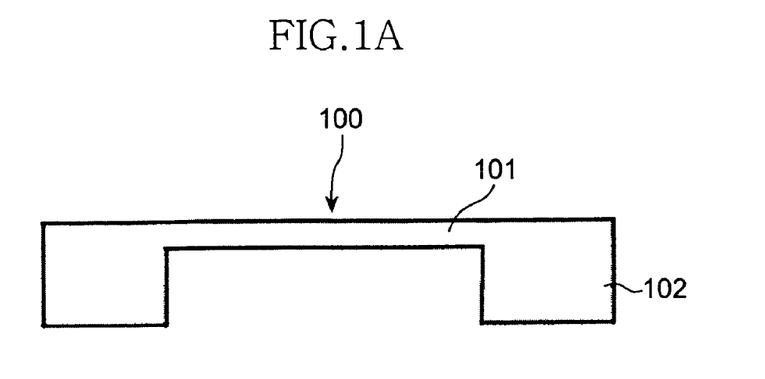
FIG. 1A and FIG. 1B are cross sectional views for explaining a plastic microfabricated structure in accordance with a first embodiment of the present invention.
Figure 1B:
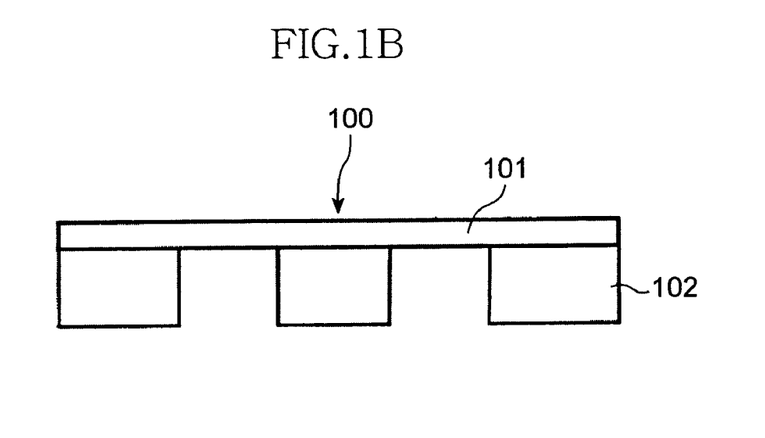

FIG. 1A and FIG. 1B are cross sectional views for explaining a plastic microfabricated structure in accordance with a first embodiment of the present invention.

The plastic microfabricated structure of the present invention comprises a plastic microfabricated substrate 101 with its surface being flat for providing a heating region 100, and a support member 102 formed in a peripheral region of the heating region 100 to support the plastic microfabricated substrate 101.

The plastic microfabricated substrate 101 is formed of a material, which has a flatness (e.g., 0.1 nm~500 nm) enough to apply a photolithography process, compatibility with respect to drug, a thin thinness of about 1 μm to 500 μm, slow heat conduction, and few thermal mass. The flatness of the plastic microfabricated substrate 101 should be enough to allow micro patterns of 0.01 μm in thickness and 1 μm in width to be formed on a typical wafer.

Examples of the plastic microfabricated substrate 101 may include a polymer such as cyclo olefin copolymer (COC), polymethylmethacrylate (PMMA), polycarbonate (PC), cyclo olefin polymer (COP), liquid Crystalline Polymers (LCP), polydimethylsiloxane (PDMS), polyamide (PA), polyethylene (PE), polyimide (PI), polypropylene (PP), polyphenylene ether (PPE), polystyrene (PS), polyoxymethylene (POM), polyetheretherketone (PEEK), polyethersulfone (PES), polyethylenephthalate (PET), polytetrafluoroethylene (PTFE), polyvinylchloride (PVC), polyvinylidene fluoride (PVDF), polybutyleneterephthalate (PBT), fluorinated ethylenepropylene (FEP), perfluoralkoxyalkane (PFA), or a mixture thereof.

The plastic microfabricated substrate 101 and the support member 102 may be fabricated by not only an injection molding process using a metallic mould processed by a chemo-mechanical polishing (CMP) process, a hot embossing process, a casting process, a stereolithography process, a laser ablation process, a rapid prototyping process, a silk screen process, but also a typical machining process such as a numerical control (NC) machining process, and a semiconductor process using a photolithography process and an etching process.

FIG. 1A shows the structure where the plastic microfabricated substrate 101 and the support member 102 are formed as one body, wherein a central portion of the plastic microfabricated substrate 101 becomes the heating region 100. FIG. 1B shows the structure where the plastic microfabricated substrate 101 and the support member 102 are separately formed of a different material from each other.

Figure 2A:
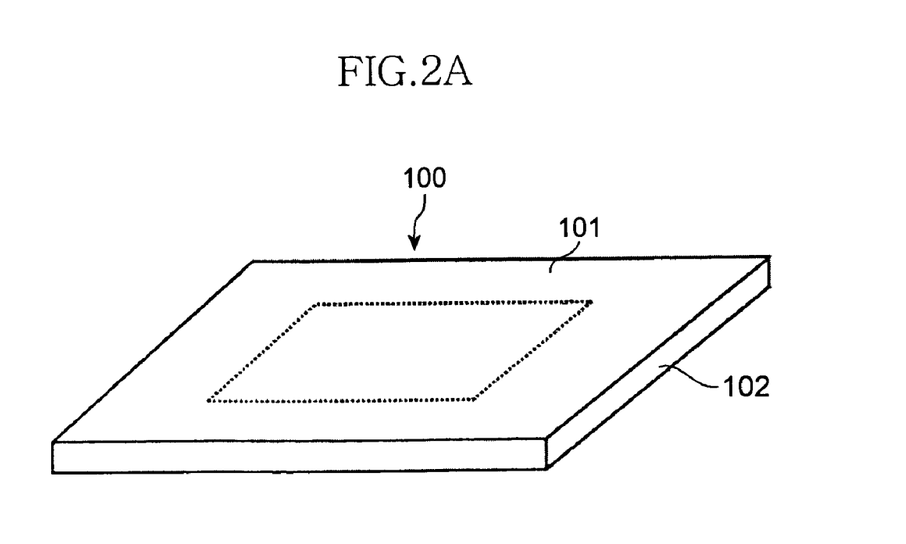
FIG. 2A and FIG. 2B are top and bottom perspective views for explaining a plastic microfabricated structure in accordance with the first embodiment of the present invention, respectively.
Figure 2B:
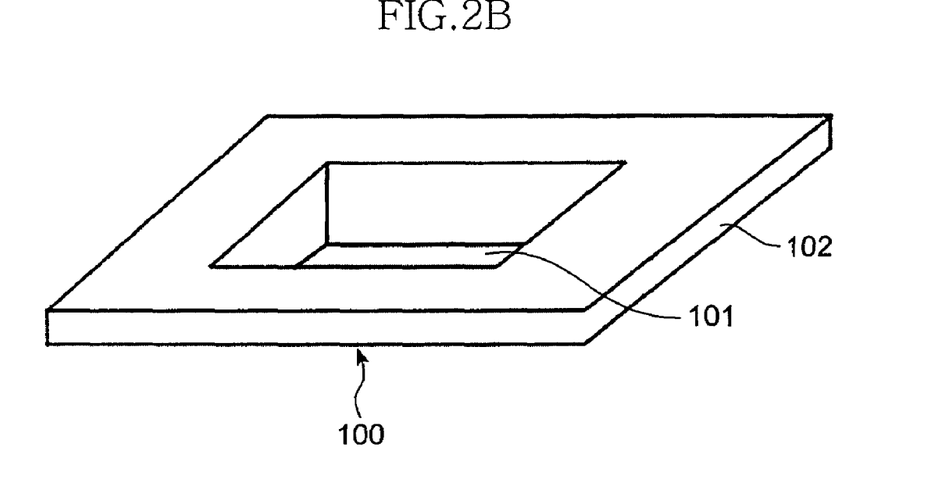

As can be seen from FIG. 2A, a front surface of the plastic microfabricated substrate 101 is flat, and its bottom surface has the heating region 100 thinner than that of the support member 102 as shown in FIG. 2B. Since the heating region 100 is thinly formed, so that it is thermally isolated and has few thermal mass to thereby enhance thermal response properties.

The plastic microfabricated substrate 101 and the support member 102 are preferably formed of the same material as one body, and it may be fabricated as an array for providing a plurality of heating regions 100 by a single process. Hereinafter, the substrate to be described below employs the structure shown in FIG. 1A or FIG. 1B.

Figure 3A:
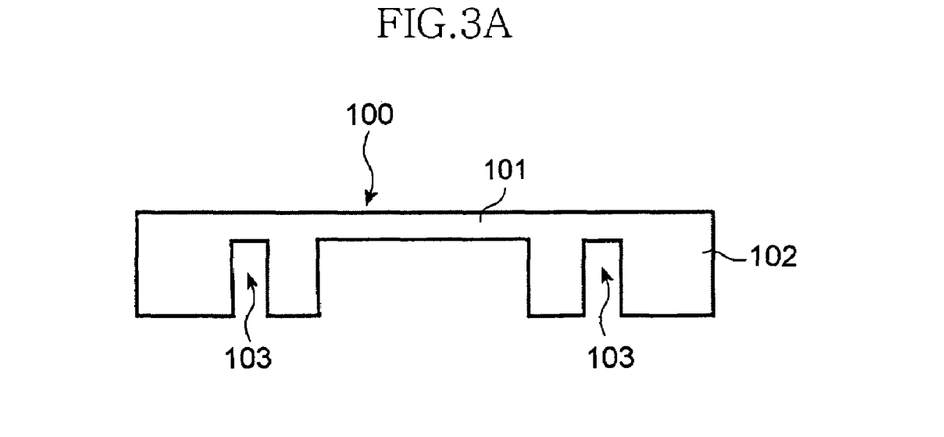
FIG. 3A and FIG. 3B are a cross sectional view and a perspective view for explaining a plastic microfabricated structure in accordance with a second embodiment of the present invention, respectively.
Figure 3B:
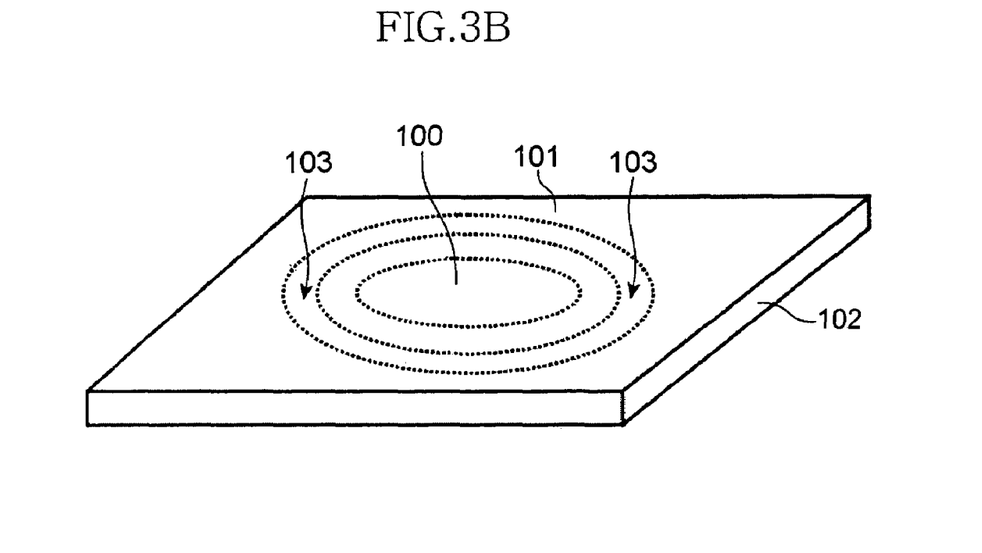

FIG. 3A and FIG. 3B are a cross sectional view and a perspective view for explaining a plastic microfabricated structure in accordance with a second embodiment of the present invention, respectively.

These drawings are modified from the structure shown in FIG. 1A and FIG. 1B, wherein recesses 103 having a predetermined depth are formed around the heating region 100 of the bottom surface of the plastic microfabricated substrate 101. Alternatively, the recesses 103 may be circularly formed in the peripheral portion of the heating region 100.

By means of the recesses 103, thermal isolation of the heating region 100 may be enhanced when the plastic microfabricated structure of the present invention is used as a microfabricated thermal device, and the structure may be extended to any desired positions and to any degrees only with the single process when the structure is used for flow control.

Figure 4A:
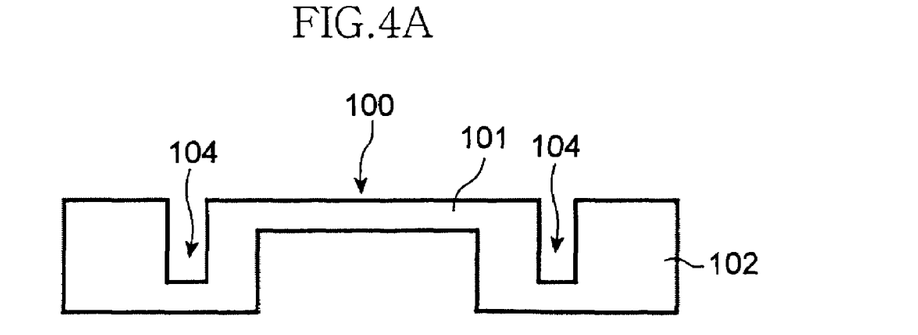
FIG. 4A and FIG. 4B are a cross sectional view and a perspective view for explaining a plastic microfabricated structure in accordance with a third embodiment of the present invention, respectively.
Figure 4B:
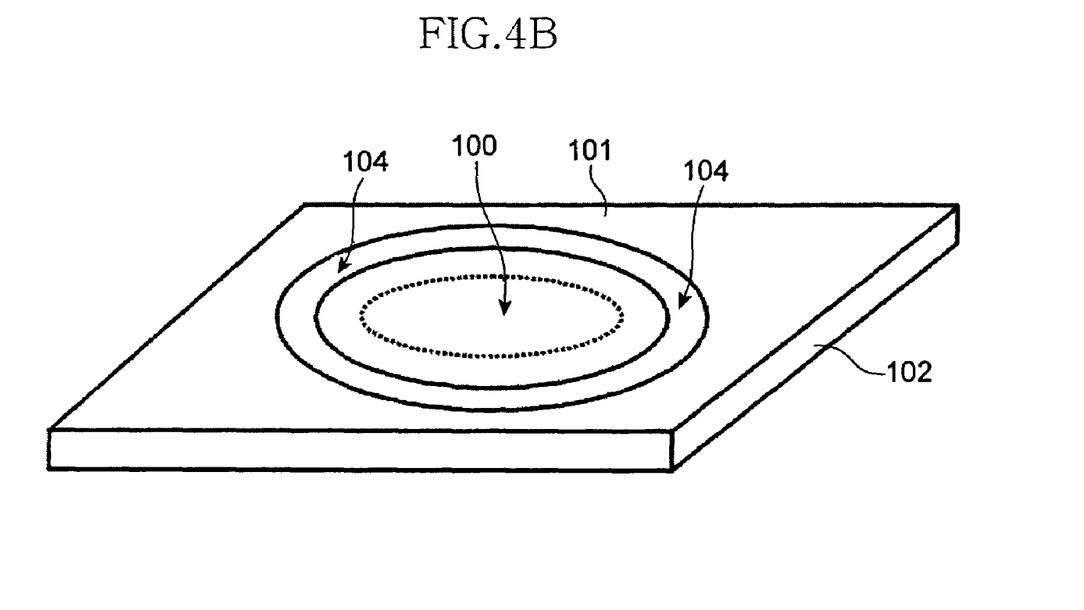

FIG. 4A and FIG. 4B are a cross sectional view and a perspective view for explaining a plastic microfabricated structure in accordance with a third embodiment of the present invention, respectively.

These drawings are modified from the structure shown in FIG. 1A and FIG. 1B, wherein recesses 104 having a predetermined depth are formed around the heating region 100 of the front surface of the plastic microfabricated substrate 101. Alternatively, the recesses 104 may be circularly formed in the peripheral portion of the heating region 100.

By means of the recesses 104, thermal isolation of the heating region 100 may be enhanced when the plastic microfabricated structure of the present invention is used as a microfabricated thermal device, and the structure may be extended to any desired positions and to any degrees only with the single process when the structure is used for flow control. Alternatively, the recesses 104 may be used as a structure such as a flow path for flow control.

Figure 5A:
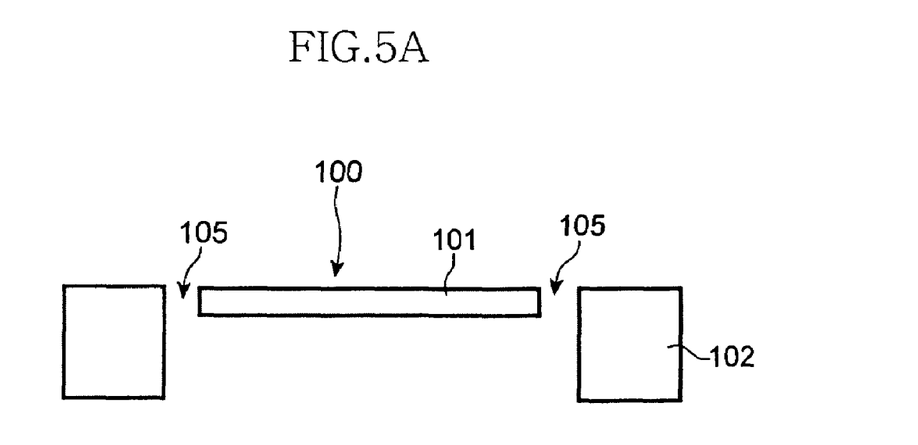
FIG. 5A and FIG. 5B are a cross sectional view and a perspective view for explaining a plastic microfabricated structure in accordance with a fourth embodiment of the present invention, respectively.
Figure 5B:
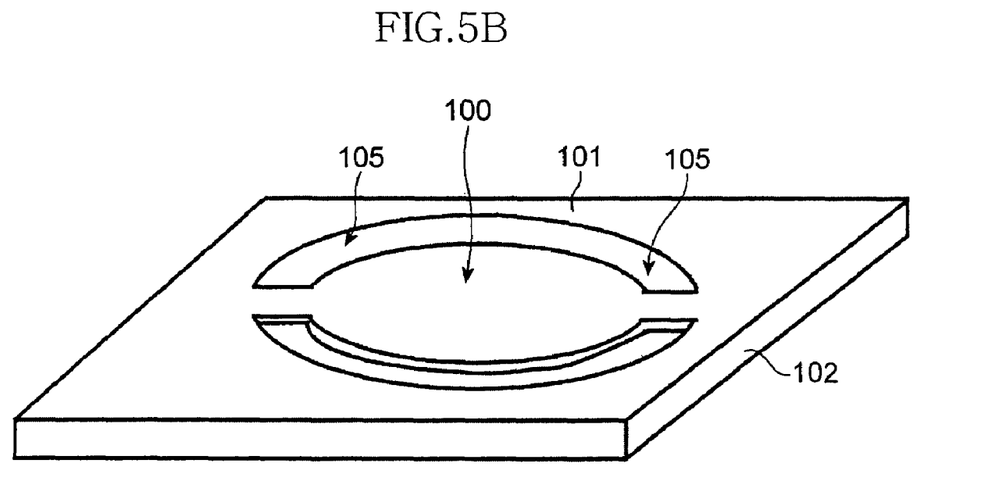

FIG. 5A and FIG. 5B are a cross sectional view and a perspective view for explaining a plastic microfabricated structure in accordance with a fourth embodiment of the present invention, respectively.

These drawings are modified from the structure shown in FIG. 1A and FIG. 1B, wherein at least one opening 105 is formed to have a predetermined length, which is extended from the heating region 100 of the plastic microfabricated substrate 101 to its peripheral portion. Alternatively, the opening 105 may be formed to be curved in the peripheral portion of the heating region 100.

By means of the opening 105, thermal isolation of the heating region 100 may be further enhanced when the plastic microfabricated structure of the present invention is used as a microfabricated thermal device, and it may be used as a flow path, an inlet, and an outlet for injecting and extracting fluid when the structure is used for flow control. In this case, the opening may be formed to any desired positions and to any degrees only with the single process.

Figure 6A:
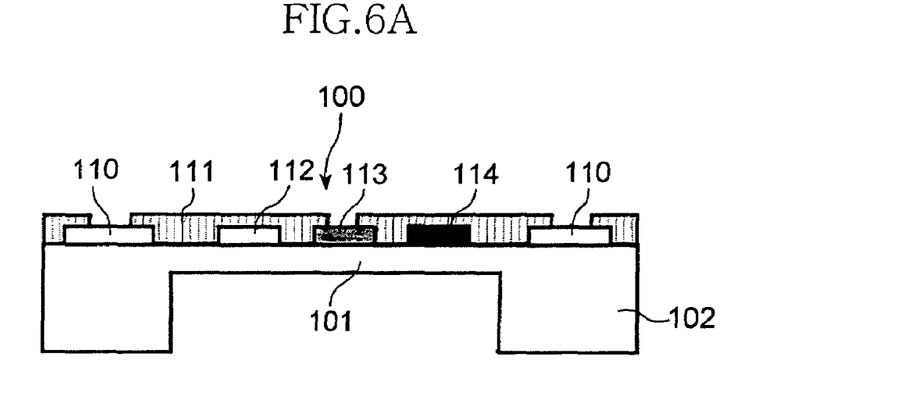
FIG. 6A is a cross sectional view for showing a microfabricated thermal device where a heater, a temperature sensor, an electrode and so forth are integrated on a plastic microfabricated structure in accordance with a first example of the present invention.

FIG. 6A is a cross sectional view for showing a microfabricated thermal device where a heater, a temperature sensor, an electrode and so forth are integrated on a plastic microfabricated structure in accordance with a first example of the present invention.

A heater 112, an electrode 113 of the heater 112, a temperature sensor 114 for sensing heat, and so forth are formed on the heating region 100 of the plastic microfabricated substrate 101, and electrode pads connected to the electrode 113 are formed on its peripheral region. And an insulating layer 111 for obtaining electrical insulation from a biological/chemical material is formed on the entire surface including the heater 112, the electrode 113, the temperature 114, and the electrode pad 110, which is patterned to allow some portions of the electrode 113 and the electrode pads 110 to be exposed.

Figure 6B:
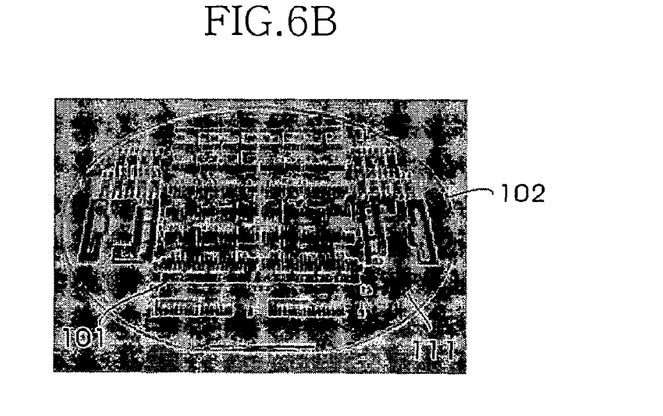
FIGS. 6B, 6C, 6D, and 6E are photographs for explaining the microfabricated thermal device shown in FIG. 6A.
Figure 6C:
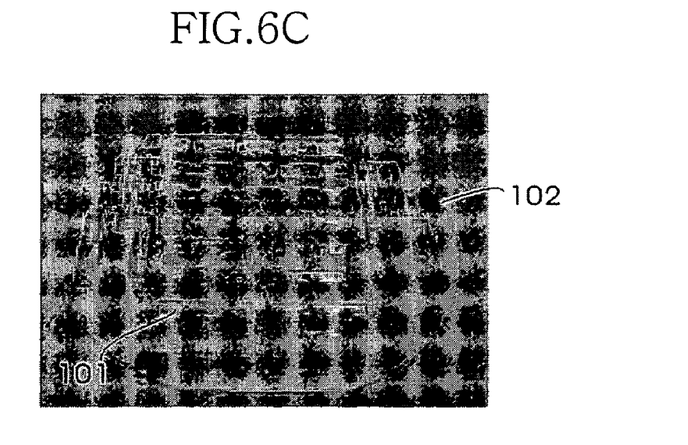

FIG. 6B is a front view photograph of the microfabricated thermal device, in which various elements such as a heater, an electrode, a temperature sensor and so forth are formed as micro metallic patterns on the COC substrate 100 fabricated by an injecting molding process employing a metallic mould processed by CMP, and FIG. 6C is a bottom view of the microfabricated thermal device.

Figure 6D:
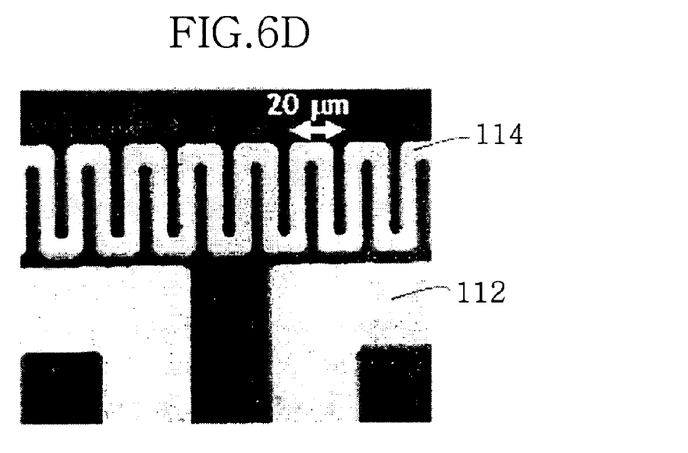

FIG. 6D is an enlarged photograph of some portion of the microfabricated thermal device, wherein micro patterns of Au having 5 µm line width formed by a photolithography process are shown. Numerical reference 114 indicates micro patterns constituting the temperature sensor, and numerical reference 112 indicates micro patterns constituting the heater.

Figure 6E:
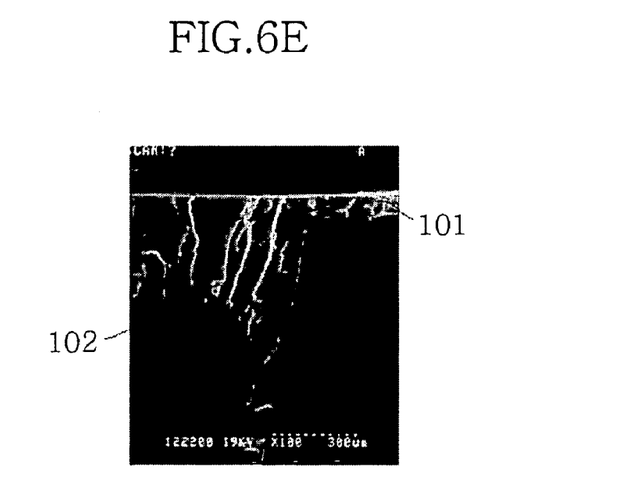

FIG. 6E is an enlarged cross sectional view of the plastic microfabricated substrate 101 used in the microfabricated thermal device, which has a thickness of about 0.01 mm to about 0.5 mm. Numerical reference 102 indicates the support member.

Figure 7A:
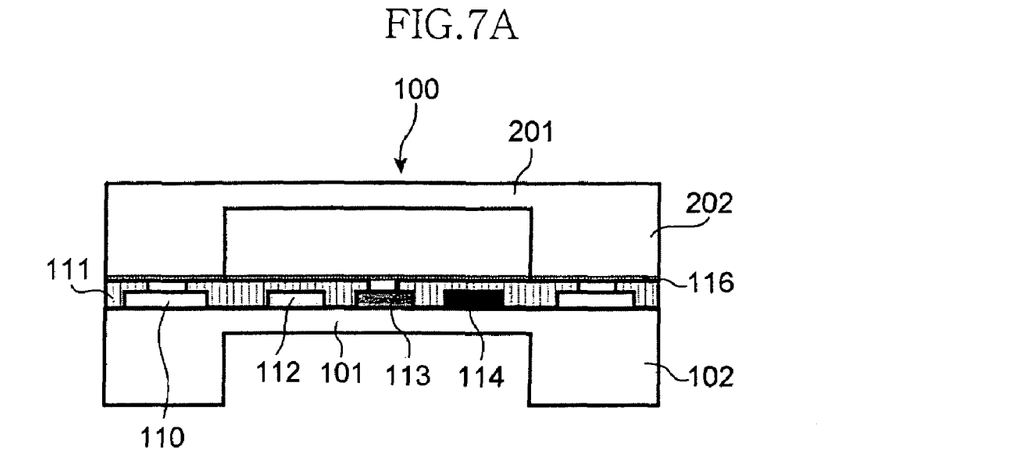
FIG. 7A and FIG. 7B are a cross sectional view and a perspective view for showing a microfabricated reactor in which the plastic microfabricated structure may be bonded to the microfabricated thermal device shown in FIG. 6A in accordance with a second example of the present invention.
Figure 7B:
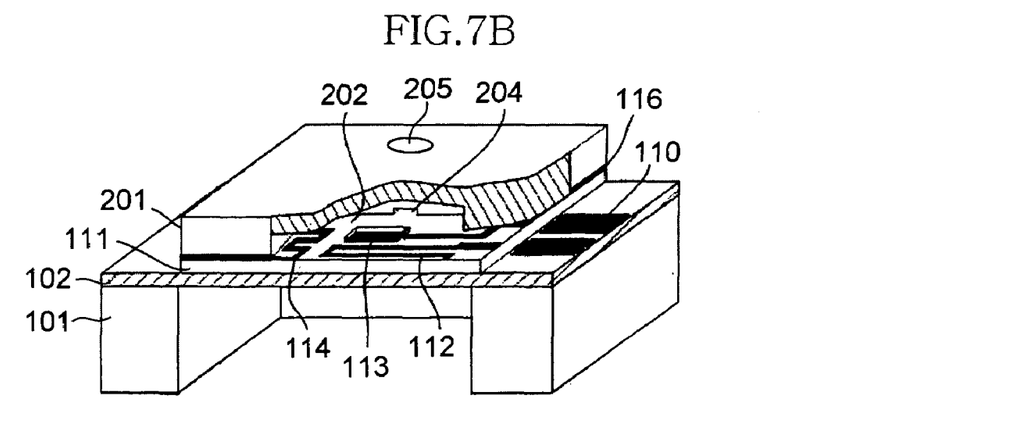

FIG. 7A and FIG. 7B are a cross sectional view and a perspective view for showing a microfabricated reactor in which the plastic microfabricated structure may be bonded to the microfabricated thermal device shown in FIG. 6A in accordance with a second example of the present invention.

The microfabricated thermal device having the configuration as shown in FIG. 6A is bonded to the plastic microfabricated structure formed of a plastic microfabricated substrate 201 and a support member 202 shown in FIG. 1A by means of a bonding material 116. Since the plastic microfabricated structure of FIG. 1A is bonded onto the microfabricated thermal device having the configuration as shown in FIG. 6A, a reaction chamber or a flow path 204 is formed therebetween.

On the plastic microfabricated substrate 201 of the plastic microfabricated structure, are formed an inlet and outlet 205 for adjusting biochemical reaction and temperature with respect to micro fluid where fluids are flown in and out, a reaction chamber for defining the fluid so as to cause reaction, a valve, a mixer, a flow path 204 for connecting the inlet and outlet to the reaction chamber, and so forth.

A thin plate type adhesive such as power or sheet as well as a liquid type adhesive may be used for the bonding material 116. In particular, when room temperature or low temperature bonding is needed to prevent denaturation of biochemical material, pressure sensitive adhesive, ultrasonic energy used for locally melting and bonding the substrate, or thermal bonding for locally meting and bonding the substrate by means of heat may be employed. One of requirements when two substrates are bonded to each other is that they should be completely bonded with respect to the flow path and reaction chamber so as to prevent injected solution from being flown outside or being flown into other regions through a fine gap or an opening other than the flow path. In addition, the lower plastic microfabricated substrate 101 and the upper plastic microfabricated substrate 201 may be forced to be engaged with each other by means of an additional structure such as a clip, or may be bonded to each other such that one of them has a positive groove and the other has a negative groove to be fixed to each other, and a polymer layer having elasticity on a contact surface may be interposed therebetween to prevent the fine gaps from occurring.

The plastic microfabricated structure of the present invention as shown in FIG. 1A may be bonded to the microfabricated thermal device of FIG. 6A, which allows the microfabricated reactor to be fabricated in a small size and at a low cost. In this case, the heating region 100 is formed of plastic, so that power consumption to a degree of the microfabricated reactor formed of silicon and fast thermal response may be obtained. As a result, a portable microfabricated reactor capable of performing a real time diagnosis may be fabricated.

Figure 8A:
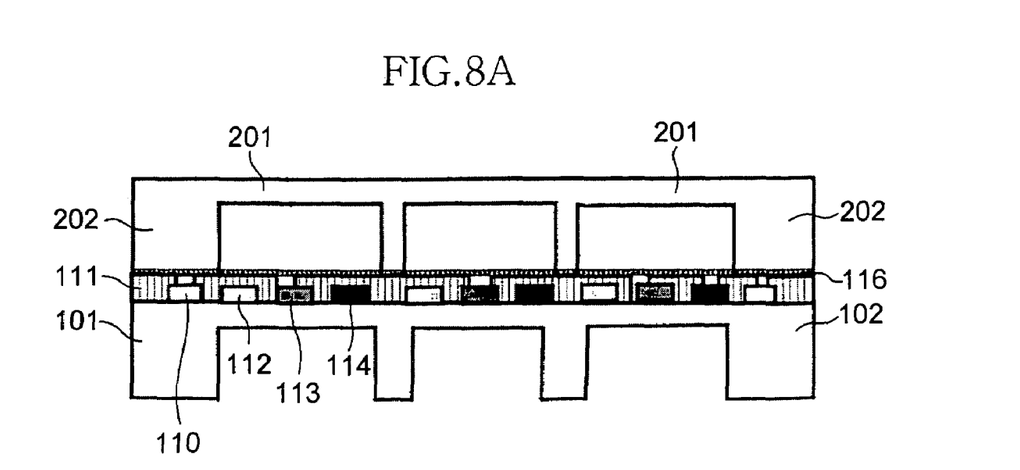
FIG. 8A and FIG. 8B are a cross sectional view and a perspective view for showing a microfabricated reactor array in which the plurality of microfabricated thermal device shown in FIG. 7A may be arranged in accordance with a third example of the present invention.
Figure 8B:
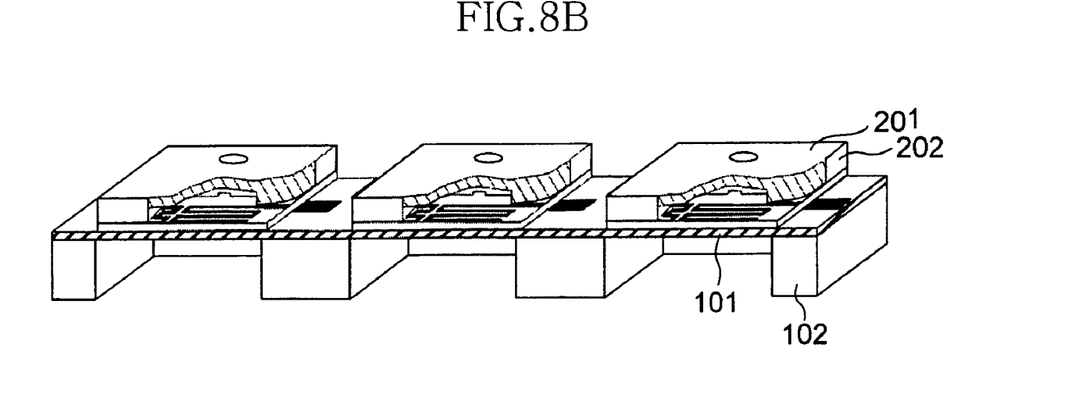

FIG. 8A and FIG. 8B are a cross sectional view and a perspective view for showing a microfabricated reactor array in which the plurality of microfabricated thermal device shown in FIG. 7A may be arranged in accordance with a third example of the present invention.

First, a plastic microfabricated structure in array for providing a plurality of heating regions 100 having the configuration of FIG. 1A is fabricated, and a microfabricated reactor having the configuration of FIG. 7A is fabricated for each plastic microfabricated structure, which leads to the formation of the microfabricated reactor array. The plastic microfabricated structure in the array may be fabricated in single process, so that a plurality of microfabricated reactors may be implemented in array with a blanket process.

Figure 9A:
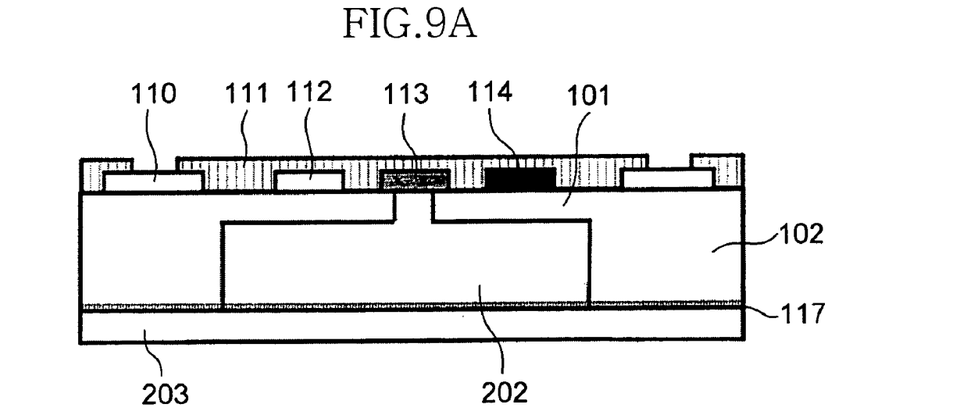
FIG. 9A and FIG. 9B are a cross sectional view and a perspective view for showing a microfabricated reactor in which the plastic microfabricated structure may be bonded to the microfabricated thermal device shown in FIG. 6A in accordance with a fourth example of the present invention.
Figure 9B:
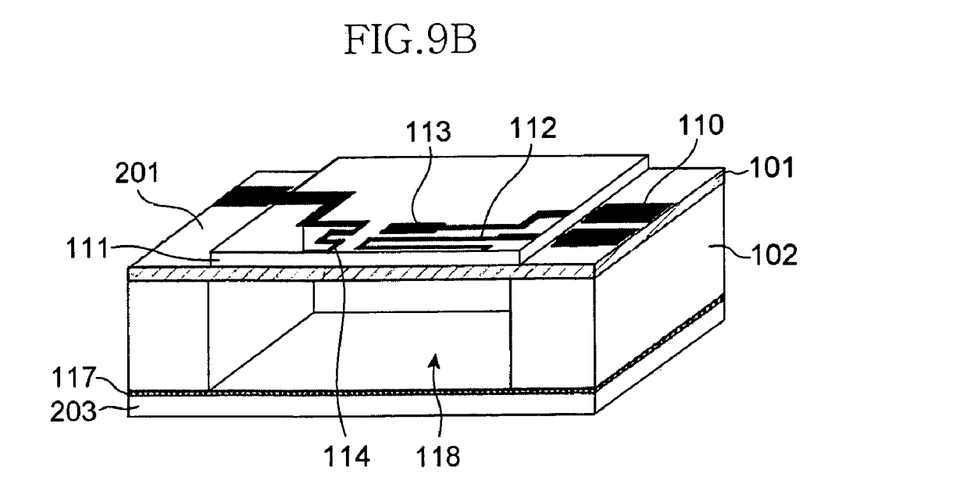

FIG. 9A and FIG. 9B are a cross sectional view and a perspective view for showing a microfabricated reactor in which the plastic microfabricated structure may be bonded to the microfabricated thermal device shown in FIG. 6A in accordance with a fourth example of the present invention.

A plastic cover 203 may be bonded to the bottom surface of the microfabricated thermal device as shown in FIG. 6A by means of an adhesive material 117, which leads to the formation of a space surrounded by the support member 102 on the bottom surface of the heating region 100, and this space is used as a reaction chamber 118. Since this structure may also be fabricated in array, a plurality of microfabricated reactors may be fabricated with a blanket process.

Figure 10A:
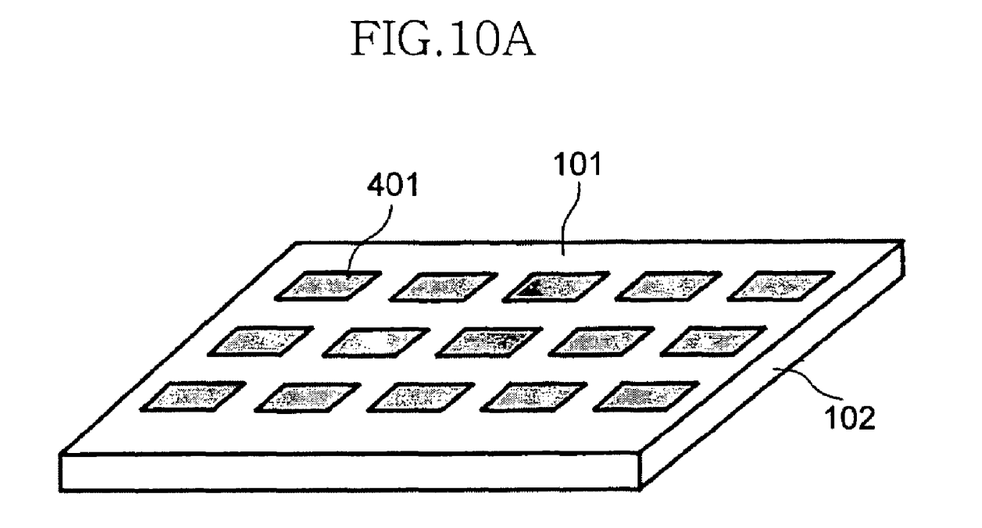
FIG. 10A and FIG. 10B are perspective views for showing a micro array capable of being formed on the plastic microfabricated structure, and for showing the state that bio material molecules are absorbed in the place where the micro array is formed in accordance with a fifth example of the present invention.
Figure 10B:
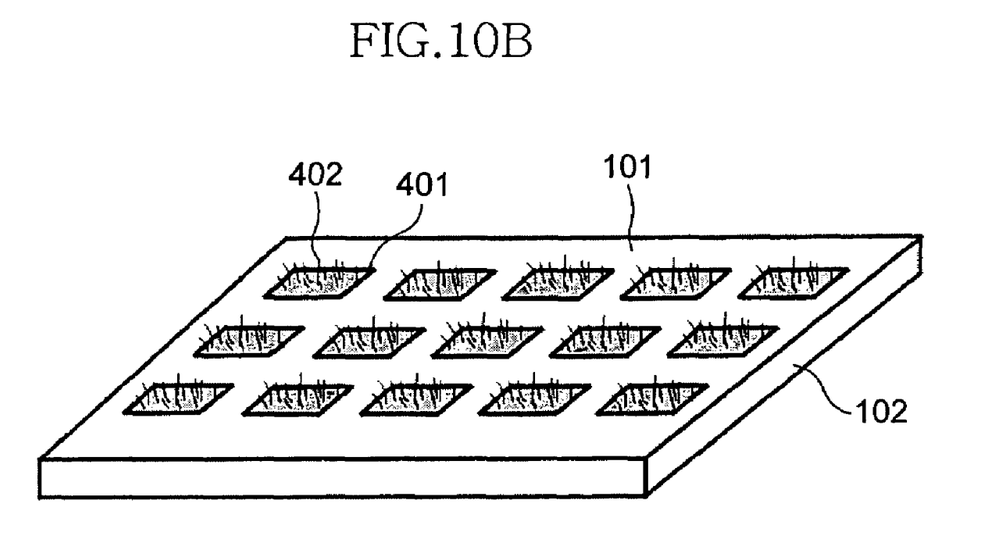

FIG. 10A and FIG. 10B are perspective views for showing a micro array capable of being formed on the plastic microfabricated structure, and for showing the state that bio material molecules 402 are absorbed in the place 401 where the micro array is formed in accordance with a fifth example of the present invention.

A plurality of sites 401 formed of a metal pattern and so forth are formed on the surface of the plastic microfabricated structure as shown in FIG. 1A.

The sites 401 that have been subject to surface treatment (such as adjustment of hydrophile properties or additional metal coating) are arranged on the micro array so as to allow interaction between thousands of genes or proteins to be recognized at the same time. The micro array is applied to gene development, disease diagnostic, new drug development, examination of toxic material reaction, and so forth. In the related art, a glass substrate or a silicon substrate is mainly employed, and these materials are suitable for forming a fine pattern, however, have a disadvantage of high cost. On the other hand, the sites 401 may be readily fabricated on the plastic microfabricated structure by means of a photolithography process in accordance with the present invention, which leads to implementation of the micro array at a low cost.

These sites 401 may be readily fabricated to a size of several micrometers as shown in FIG. 6D by means of photolithography after a metal layer is formed of gold or platinum. In accordance with the present invention, the sites 401 are formed by selectively adjusting surface reform (including hydrophilicity and hydrophbicity) employing the photolithography process and the plasma surface treatment process, which allows a probe to be selectively arranged. FIG. 10B schematically shows the sate in which bio molecules 402 such as DNA or protein form the probes.

Figure 11A:
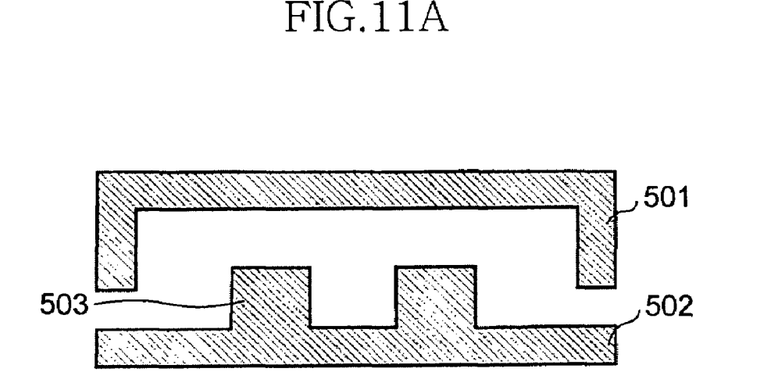
FIG. 11A to FIG. 11C are cross sectional views for explaining a method for fabricating a plastic micorfabricated structure in accordance with the present invention.
Figure 11B:
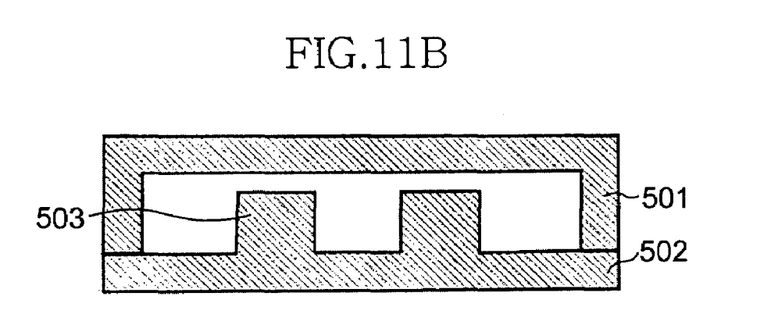
Figure 11C:
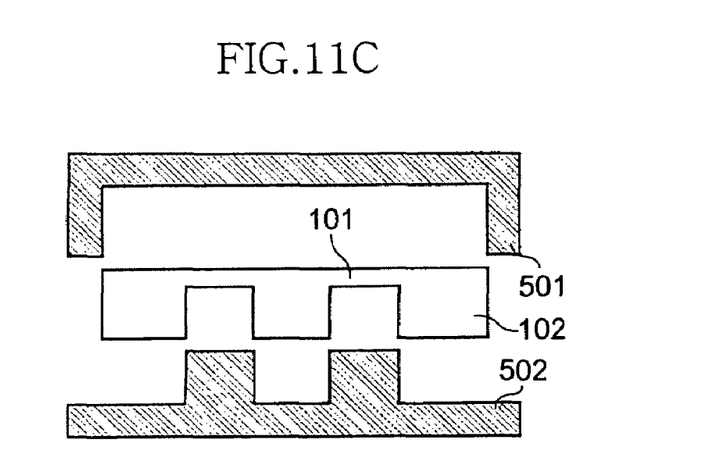

FIG. 11A to FIG. 11C are cross sectional views for explaining a method for fabricating plastic micorfabricated structure in accordance with the present invention.

Referring to FIG. 11A, a metallic mould comprised of an upper plate 501 and a lower plate 502 is employed in order to fabricate the plastic microfabricated structure of the present invention by means of the injecting molding process. The upper plate 501 is processed by the CMP so as to have high flatness in its inner surface, and the lower plate 502 has protrusions 503 for forming the heating region 100 and the support member 102.

Referring to FIG. 11B, when the upper plate 501 and the lower plate 502 are bonded to each other, an empty space is formed to have shapes of the plastic microfabricated substrate 101 and the support member 102.

Referring to FIG. 11C, after the upper plate 501 and the lower plate 502 are thermally treated, liquid plastic is injected into the space of the metallic mould and solidified, and when the upper plate 501 and the lower plate 502 are separated later, the plastic microfabricated structure of the present invention may be obtained.

As mentioned above, the present invention may fabricate the plastic microfabricated structure for providing the heating region by means of insulating plastic, which has a thickness of about 1 μm to 500 μm, flatness enough to allow a photolithography process to be performed, thermal isolation in its some or total area, and a small thermal mass. Thus, fabrication cost is reduced and process is facilitated, and the heating region is formed of a plastic thin layer, so that uniform temperature control is possible even with a low power, and various samples may be thermally treated at a fast speed to obtain their reaction and analysis. The present invention may be applied to various bio elements including a PCR chip, a protein chip, a DNA chip, a drug delivery system, a micro biological/chemical reactor, a lab-on-a-chip, and a micro array, which requires fine and accurate temperature control.

While the present invention has been described with reference to a particular embodiment, it is understood that the disclosure has been made for purpose of illustrating the invention by way of examples and is not limited to limit the scope of the invention. And one skilled in the art can make amend and change the present invention without departing from the scope and spirit of the invention.

What is claimed is:

1. A plastic microfabricated structure for a bio chip, comprising:
   a plastic microfabricated substrate having a predetermined thickness and comprising a centrally and integrally formed heating region;
   a heating electrode disposed on the heating region; and
   a support member integrally formed as part of the substrate in a peripheral region outside of the heating region for supporting the plastic microfabricated substrate, wherein the support member is of substantially greater thickness than a portion of the microfabricated substrate that comprises the heating region;
   wherein the support member completely surrounds the heating region of the plastic microfabricated substrate; and
   wherein the plastic microfabricated structure has at least one recess of a predetermined depth formed through a surface of the support member and completely surrounds the heating region.

2. The plastic microfabricated structure as claimed in claim 1, wherein the plastic microfabricated substrate and the support member are formed as a single body.

3. The plastic microfabricated structure as claimed in claim 1, wherein the at least one recess is formed through a bottom surface of the support member, wherein the predetermined depth is less than a thickness of the plastic microfabricated structure.

4. The plastic microfabricated structure as claimed in claim 1, wherein the at least one recess is formed through a front surface of the support member, wherein the predetermined depth is less than a thickness of the plastic microfabricated structure.

5. The plastic microfabricated structure as claimed in claim 1, wherein at least one opening is formed to have a predetermined length, which is extended to the plastic microfabricated substrate around the heating region.

6. The plastic microfabricated structure as claimed in claim 1, wherein the portion of the plastic microfabricated substrate that comprises the heating region has a thickness of 1 μm to 500 μm.

7. The plastic microfabricated structure as claimed in claim 1, wherein the plastic microfabricated substrate has a surface flatness of 0.1 nm to 500 nm.

8. The plastic microfabricated structure as claimed in claim 1, wherein the plastic microfabricated substrate is formed of any one of COC, PMMA, PC, COP, LCP, PDMS, PA, PE, PI, PP, PPE, PS, POM, PEEK, PES, PET, PTFE, PVC, PVDF, PBT, FEP, and PFA, or a mixture thereof.

9. A plastic microfabricated structure for a bio chip, comprising:
   a plastic microfabricated substrate having a predetermined thickness and comprising a centrally and integrally formed heating region;
   a heating electrode disposed on the heating region;
   a support member integrally formed as part of the substrate in a peripheral region outside of the heating region for supporting the plastic microfabricated substrate, wherein the support member is of substantially greater thickness than a portion of the microfabricated substrate that comprises the heating region and wherein the support member completely surrounds the heating region of the plastic microfabricated substrate; and
   at least one recess of a predetermined depth formed through at least one of a bottom surface or a front surface of the support member, wherein the predetermined depth is less than a thickness of the plastic microfabricated structure.

* * * * *